US012623406B2

(12) United States Patent
Lewicki

(10) Patent No.: US 12,623,406 B2
(45) Date of Patent: May 12, 2026

(54) SYSTEMS AND METHODS FOR ADDITIVE MANUFACTURING TO PRODUCE CARBON-CARBON PARTS WITH IMPROVED PROPERTIES AND REDUCED MANUFACTURING TIMES

(71) Applicant: Lawrence Livermore National Security, LLC, Livermore, CA (US)

(72) Inventor: James Lewicki, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 148 days.

(21) Appl. No.: 18/111,452

(22) Filed: Feb. 17, 2023

(65) Prior Publication Data

US 2024/0278499 A1 Aug. 22, 2024

(51) Int. Cl.
*B29C 64/30* (2017.01)
*B29C 64/118* (2017.01)
(Continued)

(52) U.S. Cl.
CPC ............ *B29C 64/30* (2017.08); *B29C 64/118* (2017.08); *B33Y 10/00* (2014.12); *B33Y 30/00* (2014.12);
(Continued)

(58) Field of Classification Search
CPC ..... B29C 64/30; B29C 64/118; C04B 35/624; C04B 35/6269; C04B 35/64; C04B 35/83;
(Continued)

(56) References Cited

U.S. PATENT DOCUMENTS 9,862,140 B2 1/2018 Lewicki et al.
9,944,016 B2 4/2018 Lewicki
(Continued)

FOREIGN PATENT DOCUMENTS

CN 110330351 B 12/2020
WO WO-2012-166552 A1 12/2012

OTHER PUBLICATIONS

Written Opinion and International Search Report issued in PCT Application PCT/US2024/016134 on Jun. 14, 2024.

*Primary Examiner* — Galen H Hauth
*Assistant Examiner* — Mohamed K Ahmed Ali
(74) *Attorney, Agent, or Firm* — Harness, Dickey & Pierce, P.L.C.

(57) ABSTRACT

Systems for manufacturing a Stage 1 carbon-carbon (CC) part, including a resin infused with at least one of chopped fibers, milled fibers, or a continuous fiber. The resin further may include at least one UV initiator to render the resin UV gellable upon exposure to UV light. An additive manufacturing (AM) system determines and provides tool paths needed to provide an engineered characteristic to the Stage 1 CC part. A print nozzle component of the AM system extrudes the resin in accordance with the tool paths onto a sacrificial support material layer, such that the fiber(s) are deposited in desired orientations, within each layer, in a layer-by-layer printing operation. A UV light illuminates the resin after extrusion to initiate gelation of the resin as the resin is extruded onto the sacrificial material layer, to thus form a precursor part having an imparted or enhanced performance characteristic. A pyrolysis subsystem may be used for pyrolyzing the precursor part to create the Stage 1 CC part.

16 Claims, 7 Drawing Sheets

(51) Int. Cl.

| | |
|---|---|
| *B33Y 10/00* | (2015.01) |
| *B33Y 30/00* | (2015.01) |
| *B33Y 40/20* | (2020.01) |
| *C04B 35/624* | (2006.01) |
| *C04B 35/626* | (2006.01) |
| *C04B 35/64* | (2006.01) |
| *C04B 35/83* | (2006.01) |

(52) U.S. Cl.
CPC ............ *B33Y 40/20* (2020.01); *C04B 35/624* (2013.01); *C04B 35/6269* (2013.01); *C04B 35/64* (2013.01); *C04B 35/83* (2013.01); *C04B 2235/422* (2013.01); *C04B 2235/48* (2013.01); *C04B 2235/5248* (2013.01); *C04B 2235/6026* (2013.01)

(58) Field of Classification Search
CPC .......... C04B 2235/422; C04B 2235/48; C04B 2235/5248; C04B 2235/6026
See application file for complete search history.

(56) References Cited

U.S. PATENT DOCUMENTS

| | | | |
|---|---|---|---|
| 10,173,410 B2 | 1/2019 | Nardiello et al. | |
| 2017/0015060 A1 | 1/2017 | Lewicki et al. | |
| 2017/0015061 A1 | 1/2017 | Lewicki et al. | |
| 2018/0243988 A1 | 8/2018 | Lewicki | |
| 2019/0291346 A1 | 9/2019 | Rudolph | |
| 2020/0055252 A1 | 2/2020 | Lewicki et al. | |
| 2022/0195236 A1* | 6/2022 | Arndt .................... | B29C 64/10 |
| 2023/0399520 A1* | 12/2023 | Alvarado ........... | C09D 133/062 |
| 2024/0287300 A1* | 8/2024 | Kuno .................... | B33Y 70/00 |

* cited by examiner

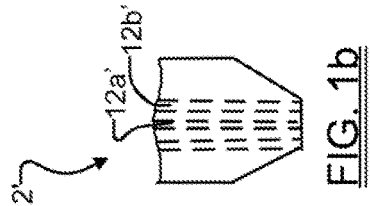

Control Signals from Computer/Electronic Controller 26

Computer/Electronic Controller 26

Control Signals for valve opening/closing

Motor drive control Signals

Flowable Material (e.g. resin) Reservoir 16

Chopped (and/or milled) Fibers 24

Valve 18b

Motion Control Subsystem (e.g., DC stepper motors) 34

Drive Signals From computer/electronic controller

UV Light 25

Spool Motor 22a

Continuous Fiber (e.g., on spool) 22

Resin Bath 23

Valve 18a

Control Signals from Computer/Electronic Controller 26

Build Plate 20a

Linear Actuator 27a

Control/Feedback Signals to/from Computer/Electronic Controller 26

Furnace
(e.g. autoclave)
50

Electronic Controller
52

Temp Sensor
54

Timer
56

Cured part

Densification Subsystem
60

1st Resin Bath within Pressure Controlled Environment
62

Cured Part

2nd Resin Bath within pressure controlled environment
64

Cured Part

Pyrolysis of AM precursor

Densification of Part

Printing with both Chopped/milled and Continuous Fiber

SYSTEMS AND METHODS FOR ADDITIVE MANUFACTURING TO PRODUCE CARBON-CARBON PARTS WITH IMPROVED PROPERTIES AND REDUCED MANUFACTURING TIMES

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to additive manufacturing systems and methods, and more particularly to new methods for producing carbon-carbon parts with engineered properties.

BACKGROUND

The statements in this section merely provide background information related to the present disclosure and may not constitute prior art.

Carbon-carbon components are a form of thermally resistant, inorganic, semi-ceramic composite containing a structurally reinforcing carbon fiber filamentary fraction within a continuous phase of $sp^2$ hybridized crystalline and amorphous, graphitic carbon. Carbon-carbon components ("CC") almost always are formed from thermal processing of a carbon fiber/organic resin precursor system. CC components find wide use in the Aerospace and Defense industries as lightweight, thermally resistant materials for use as heat-shields, rocket skirts, aerodynamic leading edges, encased thermal protection systems, as well as in other components and areas.

There are two main commercial routes to obtain CC components: pyrolysis and chemical vapor deposition (CVD). Pyrolysis has the advantage of scalability and the disadvantage of loss of volume, formation of voids, cracking/stress, and the need to somehow fill those voids in again with more carbon precursor, and to then pyrolyze again for many cycles. Accordingly, pyrolysis is therefore both time and energy intensive. Furthermore, the non-idealities of the starting materials' structure and the uncertainties of the void formation process can lead to stress concentrations, defects, distortion, cracking, and failure of parts. The yield from a traditional multistage pyrolytic CC process for large complex parts is therefore typically low.

CVD has the advantage that it does not require multiple pyrolysis and backfill operations, but it has the disadvantage of the time expense of building up a large structure, single molecular layers at a time. Possibly, the "best" CVD process is one that NASA has used for manufacturing the heat resistant tiles used on the space shuttle, which is a hybrid between pyrolysis and CVD. With this process a single pyrolysis cycle is conducted on a wet wound or prepreg carbon fiber organic layup. Then high temperature ethylene CVD is conducted over an extended timescale to grow carbon within the voids (i.e., typically over weeks at 3000° F.). The final part quality is high, but the cost of carrying out this manufacturing process is extremely high.

A second major disadvantage of the CVD based processes is this possibility of diffusion of the gaseous precursor. This is because the surface-to-volume ratio of the parts decreases as one starts to approach full density.

Accordingly, there exists a strong need in the industry for an improved carbon-carbon manufacturing process which requires fewer thermal and resin infiltration operations, and which can therefore be carried out in a much more cost effective, and shorter time frame, manufacturing process. There is a further need for a carbon-carbon manufacturing process in which a resin used by the system can be tailored to impart specific, engineered features to the finished carbon-carbon part, when used in a printing operation carried out using an additive manufacturing system.

SUMMARY

In various aspects the present technology provides additive manufacturing systems, processes and compositions. For example, the present technology provides systems for manufacturing a Stage 1 carbon-carbon (CC) part, comprising:

a photogellable additive manufacturing ink comprising a resin, a UV initiator, and at least one of chopped fibers, milled fibers or a continuous fiber;

an additive manufacturing system:

an electronic controller for determining and providing tool paths to provide an engineered characteristic to the Stage 1 CC part;

a print nozzle for extruding the additive manufacturing ink in accordance with the tool paths onto a sacrificial support material layer, the toolpaths being designed to cause the nozzle to deposit the additive manufacturing ink and the at least one of the continuous fiber, the chopped fibers or the milled fibers in desired orientations as the print nozzle moves along the tool paths, within each layer, in a layer-by-layer printing operation; and a UV light for directing UV illumination at the additive manufacturing ink after the additive manufacturing ink in extruded from the print nozzle to initiate gelation of the resin upon extrusion of the additive manufacturing ink by the nozzle onto the sacrificial material layer, to form a precursor part having an imparted or enhanced performance characteristic; and a pyrolysis subsystem for pyrolyzing the precursor part printed using the AM system to create the Stage 1 CC part.

In various embodiments, the additive manufacturing ink comprises the continuous fiber and at least one of chopped fibers or milled fibers. The additive manufacturing ink may comprise a low viscosity cyanate ester resin, a cyanurate resin, and a bisphenol F based low viscosity epoxy resin. The additive manufacturing ink may be thixotropic, for example comprising a high surface area fumed silica.

The present technology also provides methods for producing a Stage 1 carbon-carbon (CC) part, comprising:

providing an additive manufacturing ink comprising a resin, a UV initiator, and at least one of chopped fibers, milled fibers or a continuous fiber;

using an additive manufacturing system to:

create tool paths needed to provide a desired, engineered characteristic to the Stage 1 CC part;

extruding the additive manufacturing ink through a print nozzle in accordance with the tool paths onto a sacrificial support material layer, the toolpaths being designed to cause the nozzle to deposit the additive manufacturing ink and the at least one of the continuous fiber, the chopped fibers or the milled fibers in desired orientations within an X-Y plane as the print nozzle moves along the tool paths; and exposing the additive manufacturing ink to UV illumination after the resin in extruded from the print nozzle to initiate gelation of the resin, to form a precursor part in a layer-by-layer operation, such that the precursor part has an imparted or enhanced performance characteristic; and pyrolyzing the precursor part to create the Stage 1 CC part.

The present technology also provides additive manufacturing inks comprising:

An additive manufacturing ink configured for extrusion from a print nozzle of an additive manufacturing operation to create a Stage 1 carbon-carbon (CC) part, the additive manufacturing ink comprising:

a blend of low viscosity cyanate ester resin, cyanurate resin and a bisphenol F based low viscosity epoxy resin;

at least one of chopped fibers, milled fibers or a continuous fiber;

at least one UV initiator to render the resin UV gellable upon exposure to UV light after extrusion from the print nozzle onto a sacrificial support layer or a previously formed material layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1a is a more detailed block diagram of the system of FIG. 1 showing additional components that may be used with a single nozzle approach, where the single nozzle includes at least two axially spaced apart extrusion ports for supplying both continuous fibers and chopped/milled fibers;

FIG. 1b is a high level side cross sectional view of a portion of an alternative print nozzle construction in which the nozzle includes two coaxially arranged extrusion ports, one being for extruding a continuous fiber and the other being for extruding chopped/milled fibers;

DETAILED DESCRIPTION

Figure 1:
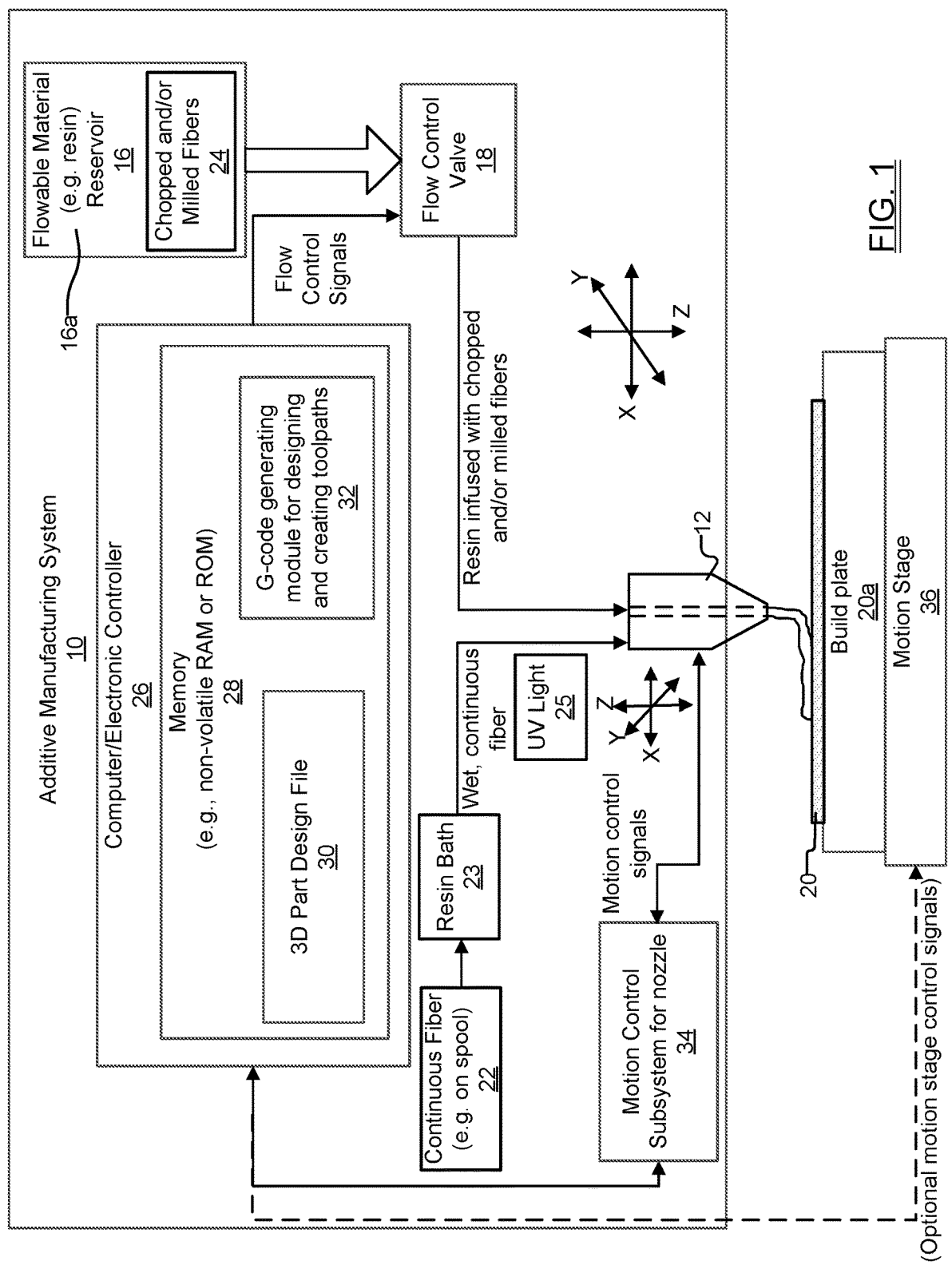
FIG. 1 is a high level block diagram of one embodiment of an additive manufacturing system in accordance with the present disclosure.

Example embodiments will now be described more fully with reference to the accompanying drawings. The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The present disclosure relates to technology comprising systems, compositions, and methods for additive manufacturing ("AM") of carbon-carbon composites. In various aspects, methods include the manufacturing of pyrolytically derived CC components by direct ink writing micro-extrusion AM technology to three-dimensionally (3D) print aligned carbon fiber loaded resin precursors that may be cured to a stable thermoset part. In various aspects, such methods In various embodiments, such composites may be devices or device components used in a variety of end-use applications, as discussed further herein.

In various embodiments, such CC components comprise two phases: a first phase comprising a carbon matrix, and a second phase comprising carbon fibers or similar materials. In some embodiments, the present disclosure provides systems, compositions and methods for making CC components in a two-stage process, comprising manufacturing a first stage a fiber-loaded carbon phase having voids (e.g., pores), and a second stage wherein a resin or other material is deposited in the voids (e.g., by infiltration). In various aspects, the present disclosure provides systems, compositions and methods for making such first stage ("stage 1") constructs.

Without limiting the scope or function of the present disclosure, the present technology offers advantages relative to CC component manufacturing methods and resulting CC components among those known in the art. For example, CC components made using the present technology may have reduced shrinkage, residual stresses (post-pyrolysis), increased geometric complexity, reduced total number of pyrolytic cycles and resin impregnation cycles required to reach full density. In various aspects, methods of the present technology may require significantly less thermal and resin infiltration steps than pyrolytic carbon-carbon manufacturing processes among those known in the art. The systems and methods of the present invention, however, are equally applicable as a means of making an enhanced precursor for a second-stage CVD densification process.

In various embodiments, an advantage may include the ability to control and rationally plan the alignment of the fibers within three dimensions in a part. This control and design of the fiber scaffold structure enables loads and stresses to be accounted for, and compensated for, during pyrolysis, as well as post pyrolysis. The result may be that internal stresses, distortion and shrinkage may be controlled and significantly minimized. This level of mesostructural control over fiber placement is not available with conventional CC methods which rely on carbon fiber composite precursors, manufactured though layup, or with bulk molding or winding processes which severely limit the range of fiber orientations available within a structure.

In various embodiments, the present technology provides the ability to manufacture complex part geometries of arbitrary mass and volume without slump or sag and at high resolution, using a wet direct ink writing micro extrusion process. Thus, the systems, methods and compositions of the present technology may allow manufacturing of complex geometric architectures such as open celled lattices, pinch bell cones, curved surfaces with planned grooves, holes or spokes are not generally manufacturable via conventional carbon composite fiber processes and therefore heretofore unavailable to CC. Additively manufactured carbon fiber composite precursors may be manufactured into a diverse range of shapes including, but not limited to, the examples mentioned above. The system and method thus provides a manufacturing route to more geometrically complex CC components.

The present technology also allows modifications to the resin phase, not only to enhance stage 1 carbon yield—but to allow the inclusion of second order chemical and or physical modifiers such as, and without limitation, ceramic fibers, metal particles and hollow glass spheres. In various embodiments, this enables the final composite material to be engineered with enhanced and novel properties. Such doping or enhancement of the resin phase of a traditional layup or wet wound precursor is typically impossible to any significant degree. This is due to the rheological constraints imposed on the resin so that it may be wet wound or pressure infiltrated into a carbon fabric. With the degrees of freedom in micro-meso and macrostructural precursor design offered by the present system and method, this enables one to also take full advantage of rational design and optimization tools developed for AM carbon composites. Thus, carbon composites can be used to design CC components not only with mechanical stress and dimensional distortion minimization in mind, but also with higher order "smart" properties such as directional heat channeling and electrical conductivity over specific paths may be considered as part of an overall optimization and design approach to an enhanced CC component.

As further described herein, the present technology provides monomer-based AM inks, which may be used in processes involving UV partial curing ("green curing") in real time as the inks are deposited in the AM process. Without limiting the mechanism, function or utility of present technology, such monomer based reactive extrudate may afford two benefits: 1) due to the low molar mass and low viscosity of the resin, inks of high solids content may be formulated which are still processable and extrudable; and 2) within an additive layer by layer process, the use of a reactive monomer allows molecular diffusion between printed strands/layers and on network cure an intimate covalent bond is formed between layers/strands with no weld line/interface/bond transition zone rendering the parts advantageous over melt extrusion systems such as FDM, particularly in strength and consolidation in the plane perpendicular to the printing plane.

AM Inks

In various aspects, the present technology comprises systems and methods for manufacturing stage 1 CC components or precursors using additive manufacturing methods (as further described herein), that may be pyrolyzed to form carbonaceous constructs comprising carbon fibers or similar functional materials. In various aspects, such methods comprise direct ink writing resinous material (an "AM ink") to produce a structure having voids which may be a stage 1 component that may be pyrolyzed before or after a resin or other material is deposited in the voids. Accordingly, the AM ink is formulated to be operable for use in direct ink writing methods, such as described herein.

In various embodiments, AM inks of the present technology comprise a photogellable blend of resins. Such AM inks include those comprising a cyanate ester resin, a cyanurate resin, and a bisphenol F epoxy resin. In some aspects, such AM inks are formulated to enable or enhance high char yields on stage one pyrolysis.

In general, cyanate ester resins useful herein include thermosetting resins having reactive ring-forming cyanate groups ($-O-C \equiv N$). Cyanate ester resins among those useful herein include the families of bi-functional bisphenol cored cyanate ester monomers including bisphenol A, Bisphenol F, Bisphenol B cored di cyanate ester systems; sulfur, ether and silyl linked bisphenol cored systems; and tri- and tetra-functional aromatic ester variants. Examples of cyanate ester monomers for use include: AroCy F-10, AroCy B-10, AroCy L-10, AroCy M-10, AroCy T-10, RTX-366 and AroCy XU371. In some embodiments using more highly substituted bi-functional and higher functional cyanate ester systems, low viscosity cyanate ester (such as bisphenol F di-cyanate ester) or low viscosity epoxy resin such as a Bisphenol-F di-epoxide added so as to be liquid at ambient conditions. Elevated temperatures of from about 80 to about 150° C. may be employed to reduce the viscosity of higher functional and substituted cyanate ester resins for use in the processes of this technology; however it may be advantageous to include a diluent. Low viscosity cyanate ester monomers may also be used directly.

Cyanurate resins include Tris(2-hydroxyethyl)-isocyanurate triacrylate, Tris(2-hydroxyethyl)-isocyanurate trimethacrylate, and Tris(2-hydroxymethyl)-isocyanurate triacrylate.

Bisphenol F epoxy resins include the bisphenol F Di-epoxide functional monomer and partially oligomerized bisphenol F di-epoxides. Higher functional tris-(hydroxyl phenyl) methane-based epoxy resins such as Huntsman Tactix 742 may also be used if diluted with low viscosity bisphenol F cyanate ester or epoxy resins.

In various embodiments, the weight ratio of cyanate ester resin to bisphenol F epoxy is from about 100:0 to 50:50, with weight ratios of about 100:0 preferred in systems comprising a cyanurate resin component. The weight ratio of cyanate ester resin to bisphenol F epoxy is preferably about 70:30 if using an epoxy resin variant, and about 50:50 preferred if using a high functional, high viscosity epoxy blended with a low viscosity diluent (for example 80:20 Tactix 742 and bisphenol F epoxide monomer). In various embodiments, the weight ratio of cyanate ester resin to cyanurate resin is from about 80:20 to about 50:50. In various embodiments the ratio is about 70:30.

In some embodiments the AM ink UV gellable, further comprising a photoinitiator selected from Norrish type 1 UV initiators, Norrish type 2 UV, or combinations thereof. Examples include phenylbis (2.4.6-Trimethylbenzoyl) phosphine oxide, 1-Hydroxycyclohexyl phenyl Ketone, Alpha, alpha-dimethoxy-alpha-phenylacetophenone, 2-Hydroxy-2-methyl-1-phenyl-1-propanone, and mixtures thereof. In addition, or in the alternative, AM inks may comprise a cationic ring-opening UV initiator system for the gelation of the epoxy components during printing operations. Examples of cationic initiators include onium salts such as triphenylsulfonium salts, diazonium salts, diaryliodonium salts, and ferrocenium salts. Specific examples include antinomy salts of diphenyliodonium and triphenylsulfonium.

The AM ink further comprises a thixotropic agent, selected from the group consisting of fumed silica, non-platelet, nanofibers, and combinations thereof. For example, the AM ink may comprise from about 1% to about 25%, or from about 5% to about 20% of a high surface area fumed silica. The AM ink may comprise from about 2% to about 10% of a nano-platelet or nanofiber additive.

In various embodiments, an AM ink further comprises carbon fibers. Such fibers may have a length of from about 0.5 μm to about 2000 μm length. In various embodiments, fibers are from about 300 to about 500 um in length, although sub fractions of fibers outside of this distribution mean can be useful in specific embodiments for matrix stiffening (e.g., low length scale of about 0.5 to about 50 um) and matrix strengthening (e.g., from about 500 to about 2000 um). In some embodiments an AM ink comprise carbon fibers at a level to provide carbon fiber volume loading of from about 20% to about 60 vol % in the final cured precursor. The weight percent of the fibers in the composition may depend on the density of the fiber, i.e., the type of fiber (pitch, rayon or polyacrylonitrile (PAN) based, for example). The fiber may be selected to be a combination of grades of a single grade of fiber to optimize final composite properties in one or more dimensions. For example, in various embodiments, PAN fibers may be used for high strength or high temperature applications, whereas processed pitch or rayon may be used for high thermal conductivity.

The AM ink may comprise one or more materials that alter the physical or functional characteristics of the AM ink or CC component made using the AM ink. For example, the AM ink may comprise ceramic nano fibers selected from the group consisting of silicon carbide, boron nitride, cellulose derived carbon nanofibers, and mixtures thereof. In various embodiments, the loading range of ceramic nanofibers is from about 0 to about 30 wt % on liquid resin mass. Such fibers may provide mechanical and thermal enhancement to a structure manufactured from the AM ink, modify the liquid rheology for process applications, and reduce the overall relative volume fraction of liquid resin in vol/vol of precursor.

In some embodiments the AM ink optionally comprises an epoxy functional colloidal silica nanoparticle dispersion, at a level of 35% or less. Such dispersions may provide both mechanical enhancement of the final material, and to increase the conversion yield of the resin to inorganic carbon, and to minimize the wet resin volume fraction of the final precured material.

In some embodiments the AM ink optionally comprises a further source of inorganic carbon or inorganic carbon precursor to increase char yield. Examples include mesophase pitch, asphaltenes or carbon black. Loadings of pitch or asphaltene slurries may be from about 0 to about 50 wt % on the liquid resin mass. Loadings of carbon black may typically range from about 0 to about 35 wt % on the liquid resin mass.

In some embodiments, AM inks may comprise curative agents, to enable thermal post curing of the composite resin. Such agents may be selected from the group consisting of rare earth organometallic epoxy curatives, transition metal organic coordination complexes, and mixtures thereof. Such agents yield a cross-linked, rigid thermoset network upon curing at temperatures from about 80° C. to about 180° C.

The AM ink may also be doped with up to about 10% of a transition metal salt, such as nickel chloride. Such metal salts may condense to form metal nanoparticles on pyrolysis, and act as seeds for the formation of nanocarbon structures, such as nanotubes and graphene, within the structure during subsequent pyrolysis or CVD operations.

As noted above and further described below, the present technology provides methods by which AM inks are partially cured during deposition so as to provide sufficient structural integrity to the printed part while allowing molecular diffusion across layers of deposited materials and layer-layer covalent consolidation, due to the partial nature of the curing and network formation. Accordingly, the AM inks are formulated to a gel point that is operable for interlayer consolidation. Practically, this optimal gel point is obtained through either calibration of the specific print process or in-line/in-process metrology (rheology, spectroscopy) to determine and verify the gelation of the material. Principle variables which must be optimized for a given resin and ink composition are catalyst loading, UV flux, UV wavelength, irradiation time/print speed and extrusion speed. For a specific process many of these are initially fixed e.g., resin and ink composition, photocatalyst loading and UV wavelength.

In various embodiments, the present technology provides AM inks comprising:

from about 35% to about 45% of a cyanate ester resin;
from about 0% to about 20% of a cyanurate resin;
from about 0% to about 20% of a bisphenol F epoxy resin;
from about 0.5% to about 2% of a photoinitiator;
from about 3% to about 6% of a thixotropic agent; and
from about 20% to about 60% of carbon fibers.

Processes and Systems

Referring now to FIG. 1, there is shown an additive manufacturing system 10 in accordance with one embodiment of the present disclosure. The system 10 in this embodiment forms a "Direct Ink Write" ("DIW") system in which a new flowable resin 16, supplied from a reservoir 16a, is used to make a 3D part in a layer-by-layer fashion. The resin 16, in one embodiment, is enhanced to enable UV induced gelation on printing. In another embodiment the resin 16 is further engineered to enable high char yields on stage one pyrolysis. In still another embodiment the resin 16 is further engineered to be thixotropic. In still another embodiment the resin 16 is engineered to provide predetermined mechanical and thermal qualities to the final produced, pyrolyzed part.

The resin 16 is supplied to a print head, for example a 5-axis print nozzle component 12, and extruded from the nozzle component 12 as a bead having a desired 3D shape depending on the configuration of a tip of the nozzle component. The flow of the resin 16 may be controlled by flow control valve 18, in one implementation via received flow control signals, to regulate the rate of flow to the nozzle component 12. The resin 16 is printed directly on a UV curable, sacrificial support material 20 which is present on a build plate 20a. A continuous fiber 22 and/or chopped or milled fibers 24 may be injected into the nozzle component 12 as well to selectively provide fiber reinforcement to each layer of the printed part. If chopped and/or milled fibers 24 are used, they be mixed into the resin 16 and supplied to one input port of the nozzle component 12 with the resin. If the continuous fiber 22 is used, this may be passed through a resin bath 23 to provide a wet, continuous fiber that is fed into the nozzle component 12. Alternatively, a second nozzle (not shown), may be coupled or slaved to the nozzle component 12 for supplying the continuous fiber 22, and such that the second nozzle moves with the nozzle component 12.

The reinforcing fibers 22 and/or 24 may be laid down with the resin 16 in discrete, engineered toolpaths with a high degree of alignment in the direction of printing. By "engineered" it is meant toolpaths that have been determined to impart and/or enhance a desired performance (e.g., structural, thermal, conductive, etc.) characteristic of the final printed 3D part. The final printed structure is multi-layer, 3D arrangement of these toolpaths generated from G-code, controlling the nozzle component 12, where the toolpaths have been sourced from a stored toolpath planning and design algorithm. The resin 16 (with one or both of the chopped/milled fibers 24 or continuous fiber 22) may be extruded from the printing nozzle component 12 and used to form each layer of a structure or part, in a layer-by-layer process, starting with an initial layer deposited on the sacrificial support material 20. One or more ultraviolet ("UV") lights 25 may be used to project UV light onto the just-deposited resin 16 to UV cure the resin virtually immediately after it is laid down. The UV light 25 may be secured or slaved to the nozzle component 12 so as to move with the nozzle component 12. Alternatively, the UV light 25 may be stationary with a beam sufficient to illuminate the entire build plate 20a at once.

As noted above, the present technology provides methods by which AM inks are partially cured during deposition so as to provide sufficient structural integrity to the printed part while allowing molecular diffusion across layers of deposited materials and layer-layer covalent consolidation, due to the partial nature of the curing and network formation. Accordingly, UV lights 25 may be located proximate to nozzle component 12 so as to facilitate such partial curing selectively to the layer of ink being printed, it being understood that optimal partial gelation of the AM ink will be affected by a variety of variables understood to one in the art, including composition of the AM ink (e.g., resin system and catalyst loading), UV flux, UV wavelength, irradiation time/print speed, and extrusion speed.

It will also be appreciated that the following discussion may refer to the article being formed at various stages of the new manufacturing processes described herein as a "component", a "part", a "precursor part", a "pyrolyzed part", a "densified part", a "cured part" or as a "structure", with it being understood that these terms are also denote a 3D article.

Referring further to FIG. 1, the system 10 may include an electronic controller 26 having a non-volatile memory 28 (e.g., RAM and/or ROM). The memory 28 may form an integrated portion of the electronic controller 26 or may be a separate component in communication with the electronic controller. The memory 30 may include one or more 3D part design files 30 that are needed to form each layer of the part in a layer-by-layer printing operation. The memory 28 may also include a G-code generating module 32 having one or more algorithms for designing and generating specific toolpaths in accordance with desired input engineering parameters specific to a given part, for each layer of the part. Again, these engineering parameters may be, without limitation, to impart or enhance a mechanical property such as structural strength, stiffness or toughness of a portion of the part. Such engineered parameters may also optionally include selectively weakening one or more specific areas; or imparting or enhancing a thermal/thermomechanical property such as a thermal conductivity, a tailored coefficient of thermal expansion, or to limit or otherwise control thermal contraction and stress concentration on cure and subsequent pyrolysis. Various combinations of the above-mentioned engineered properties may also be selectively chosen to provide a highly selectively engineered part well suited for specific uses.

In some embodiments, the CC component may be designed to have controlled density/porosity in one or more regions for the purposes of structural modification, or for reducing weight, or for the purposes of including areas purposefully constructed with enhanced ablation rates. Enhanced ablation rates could be engineered into a part to provide a wide variety of desirable features. For example, a purposeful "soft zone" could be designed into a part that would ablate significantly faster than other regions of a leading edge, to thus lead to dynamic changes in shield or flight body geometry of an airborne vehicle or spacecraft, and/or configuration or response under dynamic reentry or flight conditions of an airborne vehicle or spacecraft. The simplest examples of such a feature would be a 'timed fail hole/zone' in a shield that would "dud" the vehicle after the porous area designed into a structure or part burns away. Another example of this feature may be a heat shield with a seam that splits in two after a burn. Even more complex examples may include enhanced ablation regions which alter the surface characteristics or lifting body geometry for the purposes of maneuvering or braking an airborne vehicle or a spacecraft while in flight. These are but a few examples of important and useful engineered features that may be designed into a part or structure using the teachings of the present disclosure, and the foregoing is not intended to be an exhaustive list of potentially useful features that those skilled in this art will find the present disclosure useful for implementing.

The system 10 may also include a motion control subsystem 34 for controlling movement of the nozzle 12, assuming the build plate 20a is held stationary during the formation of each layer of the part. In some embodiments a motion stage 36 may be incorporated instead of, or in addition to, the motion control subsystem 34, for moving the entire build plate 20a along X and Y axes, for example through the control of independent X and Y axis motors associated with the motion stage 36, while the nozzle component 12 is held stationary. In some embodiments both the motion stage 36 and the motion control subsystem 34 may be used together. It is anticipated that in many applications, however, movement of the nozzle component 12 will be preferred while the build plate 20a is held stationary.

Figures 2, 3:
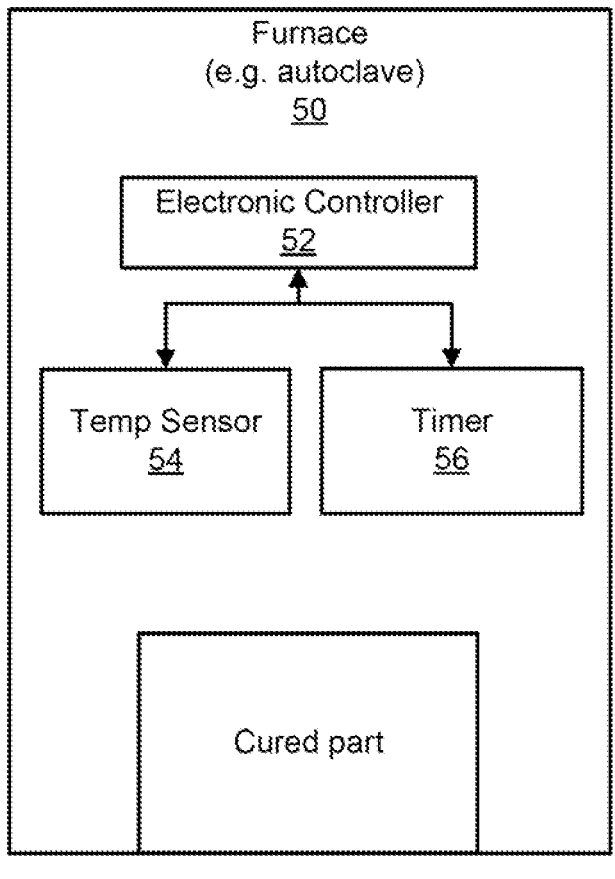
FIG. 2 is a high level block diagram of a furnace for carrying out a pyrolysis operation on a cured, additively manufactured part, in accordance with the present disclosure.
FIG. 3 is a high level view of a densification subsystem that includes first and second resin baths, for further densifying a Stage 1 CC part.

FIG. 2 shows a pyrolysis subsystem in the form of a furnace 50 that may be used in accordance with the present disclosure in carrying out a pyrolysis operation on a new printed and cured part. The furnace 50 in this example may be an autoclave (hereinafter referred to as "autoclave 50") with it's own electronic controller 52, a temperature sensor 54 and a timer 56, with the temperature sensor 54 and the timer 56 being in communication with the electronic controller 52 and/or even the electronic controller 26 (FIG. 1). The use of the autoclave 50 will be discussed further in the following paragraphs.

FIG. 3 shows a densification subsystem 60 which may be used to further densify a newly formed Stage 1 CC part. In this example the densification subsystem 60 includes a first resin bath 62 which may include a thermal catalyst loaded low viscosity cyanate ester resin, which is further enclosed within a structure, for example the autoclave 50, to enable the first resin bath 62 to be maintained under a controlled vacuum and controlled elevated pressures. A second resin bath 64 may include a cyanate ester resin (catalyzed) which has been rendered non-flowing and thixotropic, and which also is enclosed within a suitable structure (e.g., autoclave 50) to enable the application of predetermined pressures. The operations carried out during densification will also be explained further in the following paragraphs.

The present technology also provides methods for making CC composites, including stage 1 structures, using systems as discussed above. For example, through the application of short and/or long fiber carbon additive manufacturing technologies developed at the assignee of the present disclosure, including the teachings of U.S. Pat. No. 11,084,223 to Lewicki et al., issued Aug. 10, 2021; U.S. Patent Pub. No. 2018/0243988 A1, published Aug. 20, 2018; and U.S. Pat. No. 9,944,016 B2 to Lewicki, issued Apr. 17, 2018, all of which are hereby incorporated by reference into the present disclosure, as well as the teachings presented herein, a precursor to an enhanced 'Stage 1' pyrolytic carbon-carbon can be manufactured. As discussed above, the AM inks used in systems and processes of this technology may comprise fiber reinforcements. CC composites made using such AM inks may comprise fiber reinforcements having short chopped or milled fiber mixtures 24, or may have additively placed various lengths of the discrete long fiber rows 22, or combinations of any of these types of fibers. These reinforcing fiber mixtures may be laid down in discrete toolpaths via the nozzle component 12 with a high degree of alignment in the direction of printing. The final Stage 1 CC structure is formed from a 3D arrangement of designed toolpaths, implemented in a highly engineered manner in each layer of a part, which are generated from g-code, where the g-code helps to control movement of the 5-axis print nozzle component 12, in a layer-by-layer printing operation.

In various embodiments, processes comprising the use of the UV gellable AM inks further comprise formation of UV-curable support materials 20. Such support materials, allow the manufacturing of complex 3D structures with large overhangs, no slumping, and highly complex geometries, prior to a thermal cure. This enables the formation of a rigid, 3D, thermoset composite part having features that would be difficult and/or impossible to achieve with prior printing systems and prior developed resins.

The micro and macrostructure of the precursor part formed using the resin 16 may be designed based on the final component geometric and physical requirements. This may involve starting with determining property requirements for the precursor part and generating a CAD file (e.g., 3D part design file 30 in FIG. 1) of the precursor part. Computational design optimization may then be carried out in order to generate a toolpath microstructure that is optimized to control the direction of shrinkage and minimize stress concentrations in the final 3D CC part. In some embodiments secondary optimizations may be carried out to include engineered higher order functionalities. Such engineered higher order functionalities may include engineered directional thermal properties in the final 3D CC part, and/or engineered electrical and/or mechanical properties in the final 3D CC part. Topological optimizations in combination with toolpath planning may also be performed to further optimize the overall final 3D CC structure depending on part requirements and constraints.

The present disclosure further involves implementing a pyrolysis operation on the AM precursors to create a stage 1 CC material with low shrinkage and distortion, and which requires minimal densification via CVD or repeat infills and pyrolysis steps 2-X to yield a dense stage 1 CC material with significantly reduced void content. In one embodiment the density of the stage 1 CC material, after pyrolysis, is greater than or equal to 1.98 g/cc with minimal void content.

Figure 4:
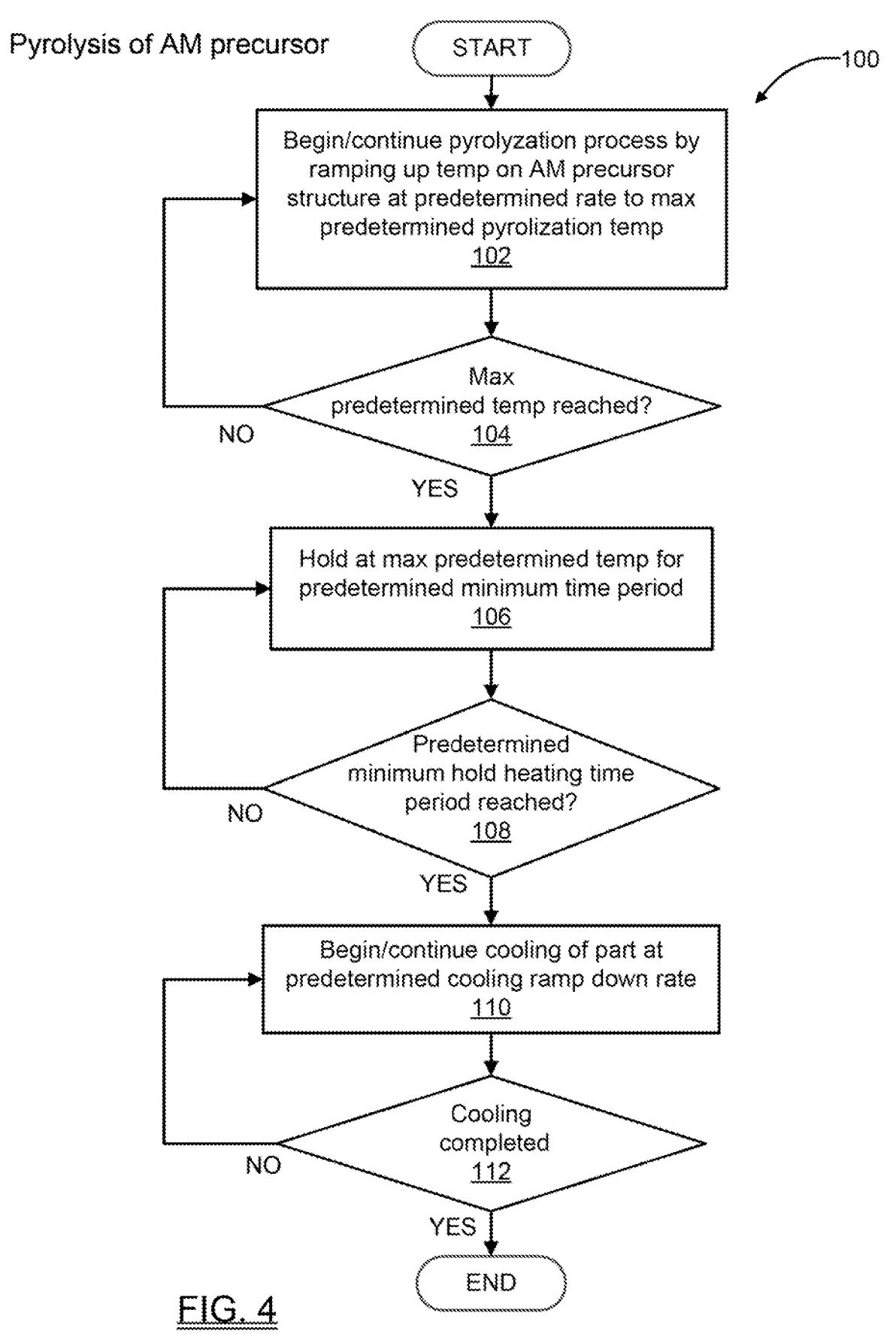
FIG. 4 is a high level flowchart illustrating various operations that may be performed in carrying out a pyrolysis operation on a cured part to create a Stage 1 CC part.

With reference to FIG. 4, a flowchart 100 illustrates high level operations that may be performed to carry out a pyrolysis process to form a stage 1 CC material from an AM precursor structure such as described herein. At operation 102 the pyrolization process begins by ramping up a temperature on the AM precursor structure at a predetermined rate to a maximum predetermined pyrolization temperature. This may be done using the autoclave 50 of FIG. 2. In one implementation this pyrolysis temperature may be up to about 1050° C., and in some implementations even up to about 2800° C. The pyrolization is carried out in a non-oxidative/reducing atmosphere, such as within a furnace or autoclave, and in one implementation within an autoclave charged with hydrogen and nitrogen. Pyrolization begins with ramping up from an initial starting ambient temperature to the maximum predetermined pyrolization temperature at a rate that does not exceed the calculated rate of thermal diffusion of the volume of part to be pyrolyzed.

At operation 104 a check may be made to determine if the maximum pyrolization temperature is reached, and if not, operation 102 may continue as the pyrolization temperature ramps up. If the check at operation 104 produces a "Yes" answer, then at operation 106 the maximum pyrolization temperature is held for a minimum predetermined heating time period. In one implementation this minimum predetermined heating time period may be for a few hours, and more preferably for at least about 12 hours.

At operation 108 a check is made to determine if the minimum predetermined heating time period has been reached, and if not, operation 106 is continued. When the check at operation 108 indicates that the minimum predetermined heating time period has been reached, then cooling of the part may begin as indicated at operation 110. In a preferred implementation, this cooling is carried out in accordance with a predetermined cooling ramp-down rate. A check is made at operation 112 to determine if cooling is complete, and if not, the cooling continues at operation 110. When the check at operation 112 indicates that cooling is complete, then the pyrolization process is complete.

Figure 5:
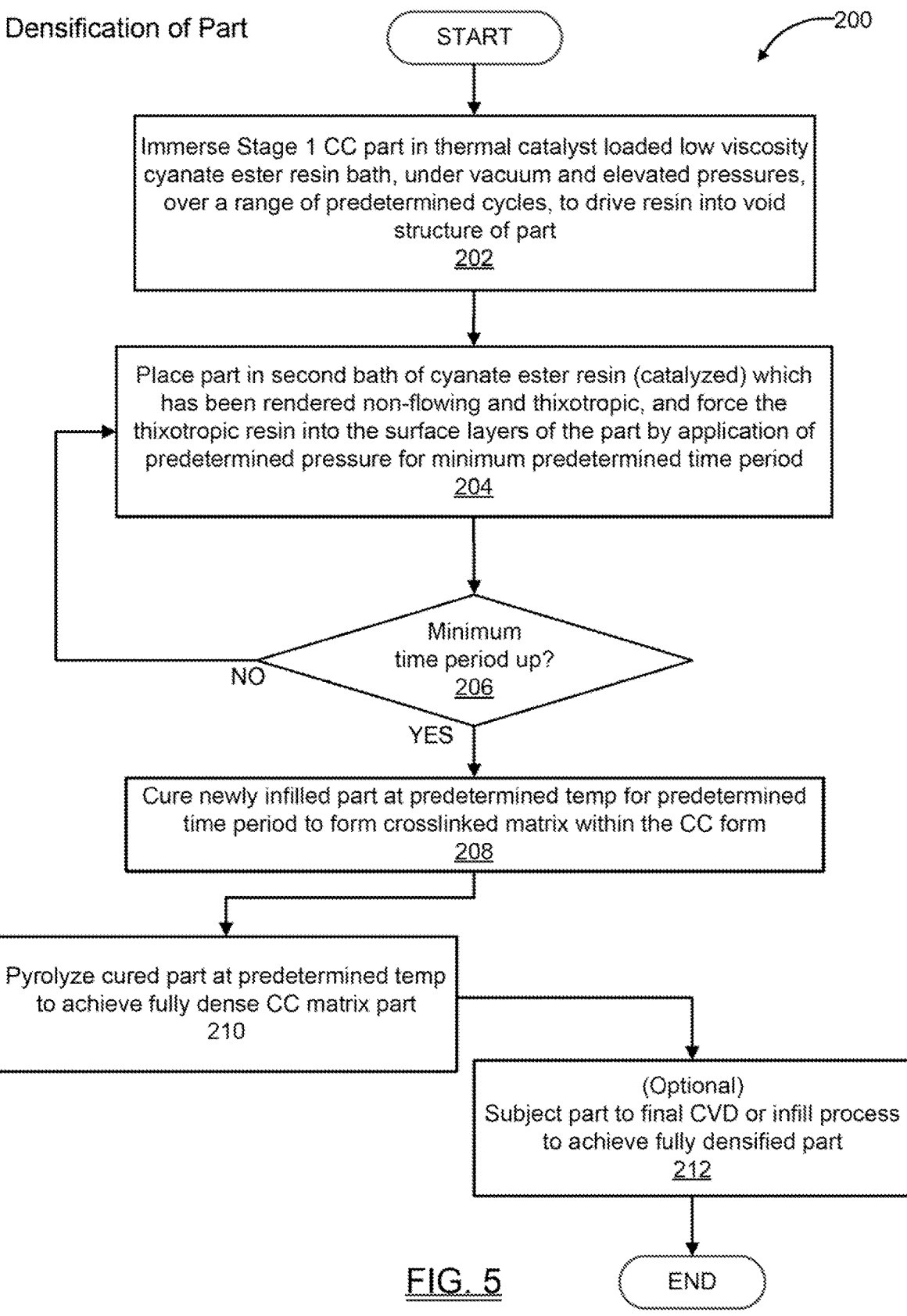
FIG. 5 is a high level flowchart illustrating various operations that may be performed in further densifying the Stage 1 CC part.

Once the part has been pyrolyzed as described above, the part may be densified. One example of the densification operation will be described in connection with the flowchart 200 of FIG. 5. It will be appreciated immediately, however, that densification of the newly pyrolyzed Stage 1 CC part is optional, and that in some instances it may be preferred to skip the densification operations shown in FIG. 5 and have a part with voids formed throughout its volume. The presence of voids in the stage 1 structure may provide the advantageous opportunity to either chemically functionalize the now high surface area carbon with chemical moieties such as, but not limited to, nitro groups, amines, fluorinated polyolefins, or silicone species for the purposes including enhanced oxidation rate, altered surface energy to (e.g., to facilitate subsequent void filling operations) or endothermic cooling as a result of thermal degradation of the functionality. The voids may also be filled with a bulk organic material, in one example melamine, in the melt phase as a further source of endothermic evaporative cooling or chemical intumescence at high temperatures. The voids may also be filled with a low melting point metal or metal alloy for providing a similar cooling function or with a readily oxidizable metal such as bismuth, either in elemental form with sufficient encapsulation, or as a polymer borne encapsulated particle suspension, for the purposes of providing an oxygen scavenging protectant medium at high temperatures.

The void space may also be filled with a high temperature performing ceramic (such as, but not limited to, a boron nitride or silicon carbide) powder suspension or slurry, or resin born suspension, capable of cast or cure, to provide a heterogeneous second ceramic thermally resistant phase in the CC composite. The void space may also be filled with an organic precursor (solgel based chemistry) to an inorganic ceramic and gelled into a stable organic matrix. Under high temperatures, in application that precursor may be induced to thermally convert into a ceramic xerogel with high thermal insulation properties. The Precursor may also be converted into a xerogel or an even less thermally conductive Aerogel prior to application via post processing using supercritical solvent extraction followed by thermal post processing.

As noted above, CC component may be designed to have controlled density/porosity in one or more regions, such as non-fully dense regions or voids in the structure. In various embodiments, such 'open-cell' voids can be filled with materials as recited above. For example, sol-gel precursor materials may be inserted into designed porosity prior to the initial carbonization process or printed as a third component of the structure with suitable thixotropic modification. This would allow for the thermal conversion to the inorganic ceramic to occur more efficiently with and not after the stage 1 pyrolysis. Printing a third pre-ceramic component as part of the structure and then thermally processing into a inorganic ceramic during stage one may be used to add channels and porosity in the CC stage 1 composite. After pyrolysis, a communicative channel of silica may be created, which can be dissolved using an acid wash, while leaving the CC structure intact. In another aspect, such structures can be made using a printable polymer composition with a very low char yield, such as a salt or carbonate filled acrylate, which will burn out on pyrolysis and require minimal acid washing to remove the ash.

In embodiments where the newly pyrolyzed Stage 1 CC part, then flowchart 200 is to be densified, processes initially involve immersing the Stage 1 CC part in a thermal catalyst loaded low viscosity bath, as indicated at operation 202. In one implementation this bath may be a cyanate ester resin bath. The immersion also preferably is made under alternative vacuum and elevated pressures over a predetermined range of cycles (e.g., typically only 1-3 cycles), to drive the resin into the Stage 1 part.

At operation 204 the newly pyrolyzed Stage 1 CC part is then placed in a second bath of cyanate ester resin (catalyzed) which has been rendered non-flowing and thixotropic. In some implementations the bath is rendered thixotropic and non-flowing by the addition of fumed silica to the cyanate ester resin bath. In one implementation the quantity of fumed silica may be in the range of from about 5 to about 20% silica on resin solids mass. The thixotropic resin is then forced into the surface layers of the part by the application of a predetermined pressure for a minimum predetermined time period. The purpose of this operation is to "seal" the part and inhibit the leakage of liquid resin from the part during curing. In one implementation both in-fill cyanate ester resins may be doped with up to 10 wt % of nickel chloride or other transition metal salts such as iron or cobalt chloride. Oxides of transition metals such as but not limited to iron, cobalt and nickel may also be used. Examples include $Fe_2O_3$ or CoO. The metal salts or oxides will condense to form metal nanoparticles on pyrolysis. These metal particles will act as seeds for the formation of nano-carbon structures such as nanotubes and graphene within the structure during pyrolysis or CVD.

In some implementations the predetermined pressure may be at least about a 2 atm pressure, and this pressure may be applied for a predetermined minimum time period, and more preferably for at least about 30 minutes.

At operation 206 a check is made to determine if the predetermined minimum time period is up, and if not, operation 204 continues. If the check at operation 206 produces a "YES" answer, then the newly in-filled, pyrolyzed, Stage 1 CC part is removed and cured as indicated at operation 208. Curing may be performed at a predetermined temperature, for at temperatures up to about 180° C., to form a crosslinked matrix within the CC part.

After curing is complete at operation 208, the CC part may be pyrolyzed at operation 210. Pyrolysis may be performed at temperatures of preferably at least about 1050° C. or above, to yield a fully dense CC matrix. Optionally, or in addition to the pyrolysis at operation 210, the newly cured part may be subjected to a final CVD or in-fill operation to achieve full density, as indicated at operation 212. If CVD is employed, the Stage 1 part is placed in a high temperature reductive environment with a pulsed pressure supply of a CVD source, for example, ethylene. The Stage 1 part is maintained in this environment over an extended timescale, in some implementations for days up to a period of several weeks, to grow graphitic carbon into the void structure. If the precursor has been doped with transition metal salts, then that rate of deposition and the structural quality of the carbon formed may be significantly increased via the seeding action of metal nanoparticle sites.

With regard to performing a CVD process, it will be appreciated that after curing, the cured part will still be a stage '0' part, that is, still a carbon organic composite. And as a result, one cannot directly CVD onto such a part; that is, the part needs to be made into a Carbon-Carbon pat first. But this could be accomplished as the first stage of an integrated CVD process, such as by slowly bring the carbon organic up to temp in a CVD system, pyrolyzing it on the way, and then once one reaches CVD temps, then beginning the growth process. So in effect, an integrated CVD system could be used to perform both the creation of a Carbon-Carbon part and a CVD process, it is important to note that there is a thermal conversion step that has to happen first, whether that be in the CVD process or external to it.

The system and method of the present disclosure provides the important benefit of enabling the precursor material to be engineered to yield final CC components with enhanced or novel chemical and or physical properties by design. Resins may be stochastically doped with materials including but not limited to metal micro particles or metal or nanoparticles for the purposes of oxygen scavenging with reduced ablation rates (e.g., bismuth), densification, and enhanced thermal or electric conductivity. The resin described herein may also be doped with glass, polymer or quartz microballoons (e.g., light weighting, intumescence). Still further, the resin described herein may also be doped with thermally or electrically conductive nanofibers, and/or whiskers, and/or platelets, any or all of which may be added to alter one or important properties such as, without limitation, CTE, thermal conductivity or electrical conductivity. All of the above-mentioned modifiers may also modify, alter, moderate or otherwise change mechanical properties and char yield for a stage 1 part.

The systems and methods of the present disclosure provide the important advantages of a plurality of degrees of freedom in micro-meso and macrostructural precursor design. The systems and methods of the present disclosure also take full advantage of rational design and optimization tools developed for AM carbon composites, which enable the design of CC components not only with qualities such as mechanical stress and dimensional distortion minimization taken into account, but also with engineered, higher order "smart" properties such as directional heat channeling and electrical conductivity over specific paths. These important factors may thus also be considered as part of an overall optimization and design approach to an enhanced CC component using the teachings of the present disclosure.

Further, as discussed above, the present technology provides methods, and AM inks useful therein, to allow partial gelation of AM inks during extrusion (deposition) in a multi-layer process so as to provide (a) sufficient structural integrity to a printed layer to allow extrusion of subsequently-deposited layers, while (b) allowing molecular diffusion of AM ink components (e.g., polymer) between layers of extruded materials and layer-layer covalent consolidation. In various embodiments, UV initiation of crosslinking reactions during extrusion and laydown of material pushes the monomer composition towards an early stage of gelation ideally achieving the minimum degree of network conversion to inhibit viscous flow (the gel-point/gel time) without pushing the system close to high degrees of conversion, during the time window for a single zone or layer to be deposited, but before the end layer or feature is deposited. While analytical relationships exist for determining the extent of reaction at gelation for well-defined stoichiometric mixtures of addition monomers (the Flory-Stockmeyer theory) or defined non stoichiometric monomer systems (statistical approaches), real world multi-component resin blends, co-reactive and interpenetrating networks, the gel points may be defined mechanically as the point in time at a specific flux of UV at a specific catalyst loading in the AM ink where translational viscous flow of the AM ink is arrested to a great extent, or the point at which the real and imaginary components of the complex modulus (the storage—elastic recovery modulus and the loss—viscous loss modulus have the same value).

In various aspects, an advantage of this partial curing or near gelation of each layer before the next is deposited is that the part geometry cannot be deformed by viscous flow and the shape is 'locked in' ensuring high resolution and geometric complexity, however molecular diffusion and layer-layer covalent consolidation is still achievable due to the partial nature of the network formation and extent of cure. Practically, this optimal gel point is obtained through either calibration of the specific print process or in-line/in-process metrology (rheology, spectroscopy) to determine and verify the gelation of the material. Principle variables which must be optimized for a given resin and ink composition are catalyst loading, UV flux, UV wavelength, irradiation time/print speed and extrusion speed.

For a specific process many of variables may be initially fixed e.g., resin and ink composition, photocatalyst loading and UV wavelength. A desired print and extrusion speed is set and most often, the UV flux and total 'bath' irradiation time are varied to obtain gelation but not a high extent of cure at the completion of a layer or feature and before laydown of another layer of material.

Non-Limiting List of Embodiments

The present technology provides various embodiments including the embodiments listed below.

Embodiment A1. A system for manufacturing a Stage 1 carbon-carbon (CC) part, comprising:

a photogellable additive manufacturing ink comprising a resin, a UV initiator, and at least one of chopped fibers, milled fibers or a continuous fiber, an additive manufacturing system:

an electronic controller for determining and providing tool paths to provide an engineered characteristic to the Stage 1 CC part;

a print nozzle component for extruding the additive manufacturing ink in accordance with the tool paths onto a sacrificial support material layer, the toolpaths being designed to cause the nozzle to deposit the additive manufacturing ink and the at least one of the continuous fiber, the chopped fibers or the milled fibers in desired orientations as the print nozzle component moves along the tool paths, within each layer, in a layer-by-layer printing operation; and a UV light for directing UV illumination at the additive manufacturing ink after the additive manufacturing ink in extruded from the print nozzle component to initiate gelation of the resin upon extrusion of the additive manufacturing ink by the print nozzle component onto the sacrificial material layer, to form a precursor part having an imparted or enhanced performance characteristic; and a pyrolysis subsystem for pyrolyzing the precursor part printed using the AM system to create the Stage 1 CC part.

Embodiment A2. The system of Embodiment A1, wherein the additive manufacturing ink comprises the continuous fiber and at least one of chopped fibers or milled fibers.

Embodiment A3. The system of any one of the preceding Embodiments, wherein the additive manufacturing ink comprises a low viscosity cyanate ester resin, a cyanurate resin, and a bisphenol F based low viscosity epoxy resin.

Embodiment A4. The system of Embodiment A3, wherein the additive manufacturing ink comprises a ratio of 1-0 fraction cyanate ester to epoxy.

Embodiment A5. The system of Embodiment A3 or A4, wherein the additive manufacturing ink comprises a ratio 80-20 ratio of cyanate ester to cyanurate resin.

Embodiment A6. The system of any one of Embodiments A3, A4, or A5, wherein the additive manufacturing ink comprises the cyanate ester and the epoxy at a ratio of from about 100:0 to about 50:50, and cyanate ester and the cyanurate resin at a ratio of from about 80:20 to about 50:50.

Embodiment A7. The system of any one of the preceding Embodiments, wherein the additive manufacturing ink is thixotropic.

Embodiment A8. The system of Embodiment A7, wherein the additive manufacturing ink further comprises from about 1% to about 25% of a high surface area fumed silica.

Embodiment A9. The system of Embodiment A7 or A8, wherein the additive manufacturing ink further comprises from about 2% to about 10% of an additive selected from the group consisting of nano-platelets nanofibers.

Embodiment A10. The system of any one of the preceding Embodiments, wherein the additive manufacturing ink further comprises ceramic nano fibers.

Embodiment A11. The system of Embodiment A10, wherein the ceramic nano fibers are selected from the group consisting of silicon carbide (SiC) fibers, boron nitride (BN) fibers, or mixtures thereof.

Embodiment A12. The system of any one of the preceding Embodiments, wherein the at least one of chopped or milled carbon fibers comprise a length of between 0.5 μm to 2000 μm in length.

Embodiment A13. The system of any one of the preceding Embodiments, wherein a carbon fiber loading of the resin comprises a loading of between about 20-60% by volume.

Embodiment A14. The system of any one of the preceding Embodiments, wherein the additive manufacturing ink further comprises an epoxy functional colloidal silica nanoparticle dispersion.

Embodiment A15. The system of any one of the preceding Embodiments, wherein the UV initiator is selected from the group consisting of a type 1 UV initiator, a type 2 UV initiator, cationic ring-opening UV initiator, and mixtures thereof.

Embodiment A16 The system of any one of the preceding Embodiments, wherein the additive manufacturing ink further comprises rare earth organometallic epoxy curatives, a transition metal organic coordination complex, or a mixture thereof.

Embodiment A17. The system of any one of the preceding Embodiments, wherein the additive manufacturing ink is doped with a transition metal salt.

Embodiment A18. The system of Embodiment A18, wherein the transition metal salt comprises up to 10% of nickel chloride.

Embodiment A20. The system of any one of the preceding Embodiments, further comprising a densification subsystem including at least one resin bath and a pyrolysis subsystem, for further densifying the Stage 1 CC part.

Embodiment B1. A method for producing a Stage 1 carbon-carbon (CC) part, comprising:

providing an additive manufacturing ink comprising a resin, a UV initiator, and at least one of chopped fibers, milled fibers or a continuous fiber;

using an additive manufacturing system to:

create tool paths needed to provide a desired, engineered characteristic to the Stage 1 CC part;

extruding the additive manufacturing ink through a print nozzle component in accordance with the tool paths onto a sacrificial support material layer, the toolpaths being designed to cause the print nozzle component to deposit the additive manufacturing ink and the at least one of the continuous fiber, the chopped fibers or the milled fibers in desired orientations within an X-Y plane as the print nozzle component moves along the tool paths; and exposing the additive manufacturing ink to UV illumination after the resin in extruded from the print nozzle component to initiate gelation of the resin, to form a precursor part in a layer-by-layer operation, such that the precursor part has an imparted or enhanced performance characteristic; and pyrolyzing the precursor part to create the Stage 1 CC part.

Embodiment B2. The method of Embodiment B1, further comprising densifying the Stage 1 CC part.

Embodiment C1. An additive manufacturing ink configured for extrusion from a print nozzle component of an additive manufacturing operation to create a Stage 1 carbon-carbon (CC) part, the additive manufacturing ink comprising:

a blend of low viscosity Cyanate ester resin, cyanurate resin and a bisphenol F based low viscosity epoxy resin;

at least one of chopped fibers, milled fibers or a continuous fiber;

at least one UV initiator to render the resin UV gellable upon exposure to UV light after extrusion from the print nozzle component onto a sacrificial support layer or a previously formed material layer.

Embodiment D1. An additive manufacturing ink comprising:

a cyanate ester resin;

a cyanurate resin;

a bisphenol F epoxy resin;

a photoinitiator;

a thixotropic agent; and carbon fibers.

Embodiment D2. The additive manufacturing ink of Embodiment D1, wherein the cyanate ester resin is present at a level of from about 35% to about 45%.

Embodiment D3. The additive manufacturing ink of Embodiment D1 or D2, wherein the cyanurate resin is present at a level of from about 0% to about 20%.

Embodiment D4. The additive manufacturing ink of any one of Embodiments D1 to D3, wherein the bisphenol F epoxy resin is present at a level of from about 0% to about 20%.

Embodiment D5. The additive manufacturing ink of one any of Embodiments D1 to D4, wherein the photoinitiator is present at a level of from about 0.5% to about 2%.

Embodiment D6. The additive manufacturing ink of one any of Embodiments D1 to D5, wherein the thixotropic agent is present at a level of from about 3% to about 6%.

Embodiment D7. The additive manufacturing ink of any one of Embodiments D1 to D6, wherein the carbon fibers is present at a level of from about 20% to about 60%.

Embodiment D8. The additive manufacturing ink of any one of Embodiments D1 to D7, wherein the weight ratio of cyanate ester resin to bisphenol F epoxy is from about 30:70, or about 50:50, or about 30:70.

Embodiment D9. The additive manufacturing ink of any one of Embodiments D1 to D8, wherein the thixotropic agent is selected from the group consisting of fumed silica, non-platelet, nanofibers, and combinations thereof.

Embodiment D10. The additive manufacturing ink of any one of Embodiments D1 to D9, further comprising ceramic nano fibers selected from the group consisting of silicon carbide, boron nitride, and mixtures thereof.

Embodiment D11. The additive manufacturing ink of any one of Embodiments D1 to D10, further comprising an epoxy functional colloidal silica nanoparticle dispersion.

Embodiment D12. The additive manufacturing ink of one any of Embodiments D1 to D11, further a comprising curative agent selected from the group consisting of rare earth organometallic epoxy curatives, transition metal organic coordination complexes, and mixtures thereof.

Embodiment E1. A method for producing a carbon-carbon (CC) part, comprising:

extruding an additive manufacturing ink through a print nozzle component of an additive manufacturing device, in accordance with a tool paths onto a sacrificial support material layer, the toolpath being designed to cause the print nozzle component to deposit the additive manufacturing ink in desired orientations within an X-Y plane as the print nozzle component moves along the tool paths; and exposing the additive manufacturing ink to UV illumination after the resin in extruded from the print nozzle component to initiate gelation of the resin, to form a precursor part in a layer-by-layer operation, such that the precursor part has an imparted or enhanced performance characteristic; and pyrolyzing the precursor part to create the Stage 1 CC part;

wherein the additive manufacturing ink comprises a UV photocurable resin,
a photoinitiator; a thixotropic agent; and carbon fibers.

Embodiment E2. The method of Embodiment E1, wherein the photocurable resin comprises a cyanate ester resin; a cyanurate resin; and a bisphenol F epoxy resin.

Embodiment E3. The method of Embodiment E2, wherein the additive manufacturing ink is an ink of any of Embodiments D2 to D12.

Embodiment E4. The method of any one of Embodiments E1-E3, wherein the gelation of the resin is operable to partially gel the resin.

Embodiment E5. The method of Embodiment E4, wherein the resin, after gelation, has sufficient structural integrity to allow deposition of additional resin, while allowing molecular diffusion of AM ink components (e.g., polymer) between the resin and the additional resin.

Embodiment E6. A method for producing a carbon-carbon (CC) part, comprising:
a first extruding of an additive manufacturing ink through a print nozzle component of an additive manufacturing device to form a first layer of ink, the ink comprising UV curable polymeric components and a photoinitiator;
a first partially-curing using UV light, the first layer of ink; a second extruding the additive manufacturing ink through a print nozzle component of the additive manufacturing device to form a second layer of ink using the UV light;
partially-curing the second layer of ink; and
a second partially curing using UV light, of the second layer of ink;
wherein first layer of ink and second layer of ink exhibit structural integrity and diffusion of the polymeric components between the first layer of ink and the second layer of ink.

Embodiment E7. A method of Embodiment E6 wherein the structural integrity and diffusion of polymeric components is effected by selection of the composition of the ink, the flux and wavelength of the UV, the duration of the first partially curing and the second partially curing; and the speed of the first extruding and the second extruding.

Embodiment E8. The method of Embodiment E6 or Embodiment E7, wherein the photocurable resin comprises a cyanate ester resin; a cyanurate resin; and a bisphenol F epoxy resin.

Embodiment E9. The method of any of Embodiments E6 to E8, wherein the additive manufacturing ink is an ink of any of Embodiments D2 to D12.

Embodiment E10. The method of any one of Embodiments E1 to E9, wherein the carbon-carbon part is a stage 1 component.

Embodiment E11. The method of Embodiment E10, wherein the stage 1 component comprises a void.

Embodiment E12. The method of Embodiment E11, further comprising depositing a material in the void after the pyrolyzing.

Embodiment E13. The method of Embodiment E12, wherein the depositing is by CVD.

Embodiment F. A carbon-carbon part made by a process of any one of Embodiments B1, B2, and E1 to E13.

Additional Embodiments and Methods Involving Printing with Both Continuous Fiber and Chopped/Milled Fibers The present disclosure in still another aspect involves a plurality of different, new approaches for combining multiple processes and materials chemistries to enable hybrid, fiber reinforced additively manufactured materials, structures or parts to be printed. The materials, structures or parts may be composed of chemically contiguous short fiber regions, together with continuous filament regions, and form architected microstructures. By "architected" it is meant engineered in that the materials, structures or parts are purposefully designed with specific desired materials properties, characteristics or performance capabilities to tailor them for specific applications. For convenience, the term "materials or parts" may be used throughout the following description, with the understanding that this terminology includes structures, which may not be thought of as a "material" or a "part", as well.

With such architected materials, the resin phase composition can be varied between rigid and elastomeric and can be varied in density as a function of resin loading with, for example, hollow of solid spheres of additives to yield further degrees of multifunctionality to a single part, derived from a single process. The resultant printed articles will maintain the advantages of previously disclosed single material fiber reinforced thermoset materials such as the ability to print in arbitrarily complex geometries, internal structures, scales, and at high resolution. And the complex multi-material hierarchical composite structures may be further improved to full advantage by the application of design optimization and toolpath planning algorithms to yield optimal toolpaths orientation for the short and long fiber regions of the manufactured materials, to optimize material properties for a specific application.

FIG. 1a shows a system 10' in accordance with another embodiment of the present disclosure, which is somewhat similar to the system 10 shown in FIG. 1, but illustrates additional components that may be used in printing with both continuous/milled fibers and a continuous fibers. Components in common with the system 10 are denoted with the same reference numbers used in FIG. 1. The system 10' in this example uses independently controlled electronic flow control valves 18a and 18b to help control the application of both resin infused continuous fiber 22 and the resin infused chopped/milled fibers 24 during the print process, through a single print nozzle component 12'. In this example axially spaced apart extrusion passages 13a and 13b, respectively, are formed within the nozzle component 12 for separately carrying the continuous fiber 22 and the chopped/milled fibers 24. A spool motor 22a controllably unspools continuous fiber 22 in response to motor drive signals from the computer/electronic controller 26. In this regard it will be noted that while FIGS. 1a and 1c (to be described) do not expressly illustrate the memory 28, 3D part design file 30 and G-code generating module 32, that these subsystem will typically be included with the systems 10' and 10" as well, either as integral components of the computer/electronic controller 26 or as separate components in communication with the computer/electronic controller 26.

FIG. 1a also a cutting blade 27 which may be controlled for reciprocating movement by a movement control subsystem such as a linear actuator 27a. The blade 27 may be controlled to selectively cut the continuous fiber 22 at one or more time while the continuous fiber 22 is being laid down, in accordance with control signals supplied by the computer/electronic controller 26 to the linear actuator 27a. This helps facilitate "tacking" points of the continuous fiber 22 when using the UV light 25, the benefits of which will be explained further in the following paragraphs.

If the chopped/milled fibers 24 are exclusively chopped fibers, then the lengths of the chopped fibers may vary significantly. In some embodiments the lengths of the chopped fibers may be between about 150 microns and several centimeters in length. If the chopped/milled fibers 24 are exclusively milled fibers, then the milled fibers will typically be much shorter in length. In some embodiments the lengths of the milled fibers may vary from a few microns to around 150 microns in length, and in some applications between about 15 microns to about 150 microns in length. Both chopped and milled fibers may be included in the mixture that makes of the chopped/milled fibers 24, as well as a plurality of different lengths of chopped fibers and a plurality of different lengths of milled fibers.

FIG. 1b shows a print nozzle component 12a' in accordance with another embodiment of the present disclosure that may be used with the system 10'. The print nozzle component 12a' in this example includes an axially centered passageway 12a' which may be used to extrude the resin infused continuous fiber 22, and a larger, coaxially arranged, outer flow passage 12b' which circumscribes the passageway 12a', which may be used to extrude the resin infused chopped/milled fibers 24. The two passageways 12a' and 12b' may have the same cross-sectional area dimension, or they may have different cross-sectional area dimensions. Each of the passageways 12a' and 12b' may also be consistent in cross-sectional area over their full axial lengths, or they may have a taper which produces a varying cross-sectional area over the full axial length of the nozzle component 12'. And while only two coaxial passageways 12a' and 12b' are shown, it will be appreciated that the system 10' is not limited to use with only two such passageways, but could instead incorporate three or more passageways to deposit still further types of fibers, for example resin infused chopped/milled fibers from a separate source (not shown) which differ in composition and/or dimension from the chopped/milled fibers 24.

Figure 1C:
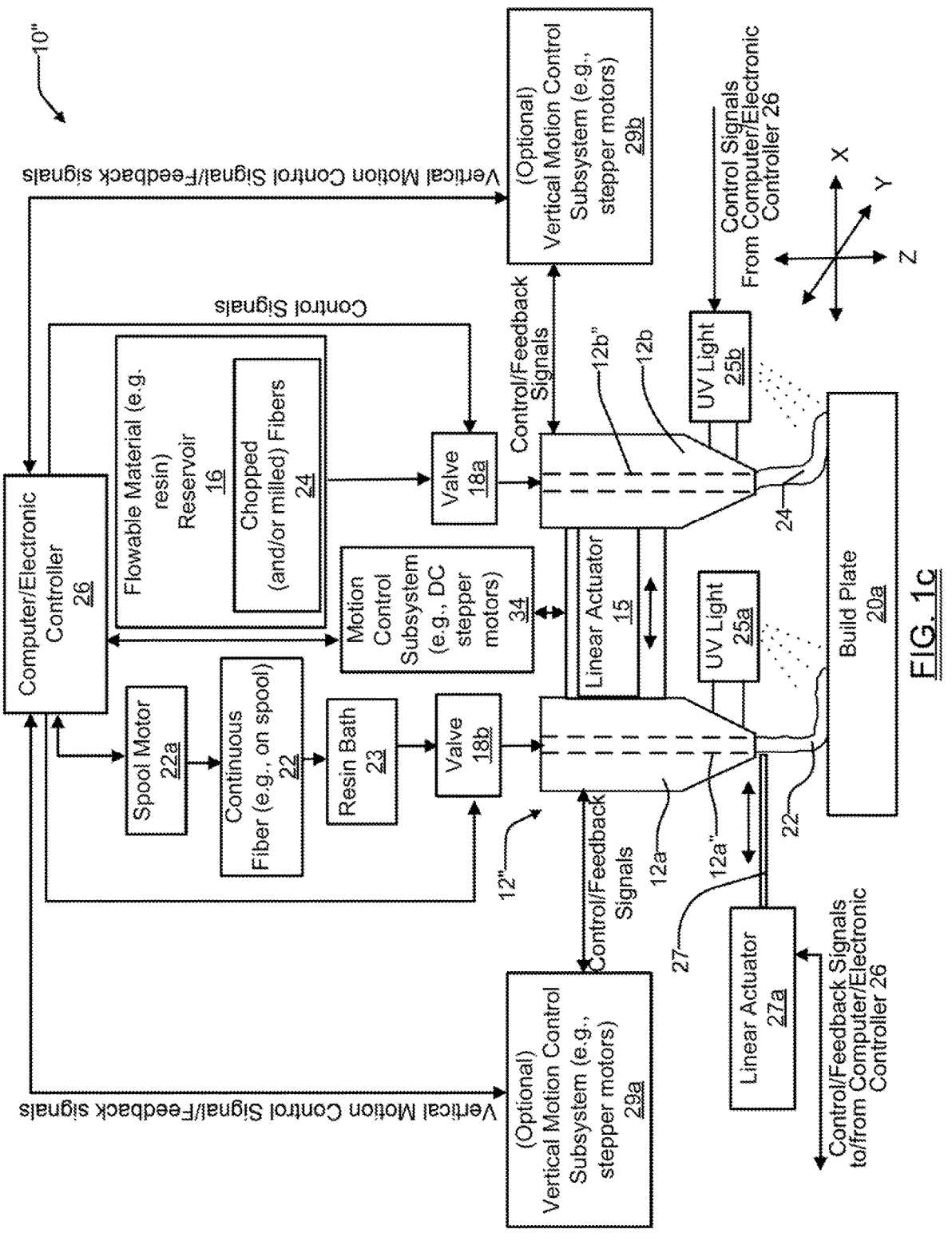
FIG. 1c is a block diagram of another embodiment of the present disclosure which is somewhat similar to that shown in FIG. 1, but which includes two independent print nozzles slaved to each other, and movable using a single motion control subsystem.

Referring to FIG. 1c, a system 10" is shown in accordance with another embodiment of the present disclosure. The system 10" is similar to system 10' in that both the resin infused continuous fiber 22 and the resin infused chopped/milled fibers 24 are both extruded through a print nozzle component 12", but the print nozzle component 12" in this example includes two separate print nozzles 12a and 12b which are spaced laterally apart from one another and slaved to one another. By "slaved" it is meant they are either physically secured to another or otherwise formed from a common section of material, but in either case the two print nozzles 12a and 12b are able to move together in perfect synchronization in response to control and/or drive signals supplied to the motion control subsystem 34. Nozzle 12a includes axial passageway 12a" and nozzle 12b include axial passageway 12b".

The system 10" of FIG. 1c also may include dual UV light subsystem 25a and 25b which may be controlled independently by the computer/electronic controller 26 to "tack" or cure one or the other of the resin infused continuous fiber 22 or resin infused chopped/milled fibers 24 being laid down on the build plate 20a during a printing operation. And while FIG. 1c shows the two print nozzles 12a and 12b being spaced a significant distance from one another, in practice it is expected that for most applications, it will be more desirable to have the output ports of the two print nozzles 12a and 12b relatively close to one another (e.g., more typically within 2 mm to 100 mm of one another). Physically separated nozzles can offer an advantage in the ability to independently gel regions of the deposited material with UV light to different extents, over different timescales to yield structural stability to different degrees, depending on the laydown material and/or the dimensional/geometric requirements.

The system 10" also may include the blade 27 and the linear actuator 27a for moving the blade 27 to selectively cut the continuous fiber 22. Still further. An additional linear actuator 15 may be used to mechanically couple the two print nozzles 12a and 12b, which enables the lateral spacing between the two nozzles 12a and 12b to be controllably varied using suitable control signals from the computer/electronic controller 26 and/or the motion control subsystem 34. The spacing between the two print nozzles 12a and 12b may be varied in real time during printing of a layer to further help tailor the final properties of a material or part being made. Both closed loop and open loop control systems may be employed, using the computer/electronic controller 26, when providing real time control over the spacing of the two print nozzles 12a and 12b.

FIG. 1c also shows the system 10" incorporating optional additional motion control subsystems 29a and 29b for independently controlling the elevational positioning (i.e., Z axis movement) of the print nozzles 12a and 12b. Control of the elevational positioning of the print nozzles 12a and 12b may be accomplished either with an open loop system, or with the help of suitable control/feedback signals supplied by the computer/electronic controller 26 in real time in a closed loop system. Varying the elevational positioning of one or both of the print nozzles 12a and/or 12b while one or the other, or both, of the continuous fibers 22 or chopped/milled fibers 24 are being laid down, may further enable select physical characteristics or properties of the finished part (e.g., to enable one extrudate to be patterned over a non-uniform region of a substrate or to allow the continuous filament to be lifted from the work for cutting and restart operations). to be controllably varied. It is also possible that 3D (z-axis weaving) may be possible for continuous fibers with this motion.

It will also be appreciated that while various systems have been shown in the figures and described above for controlling movement of the print nozzle 12, or 12' or 12" in X, Y and Z dimensions, that the movement described for the print nozzle 12, 12' or 12" may just as readily be achieved by controllably moving the build plate in X, Y and Z dimensions, using control signals from the computer/electronic controller 26. Movement may be carried out using the computer/electronic controller 26 operating as part of an open loop system with suitable stored data or lookup tables, or via a closed loop system.

Figure 6:
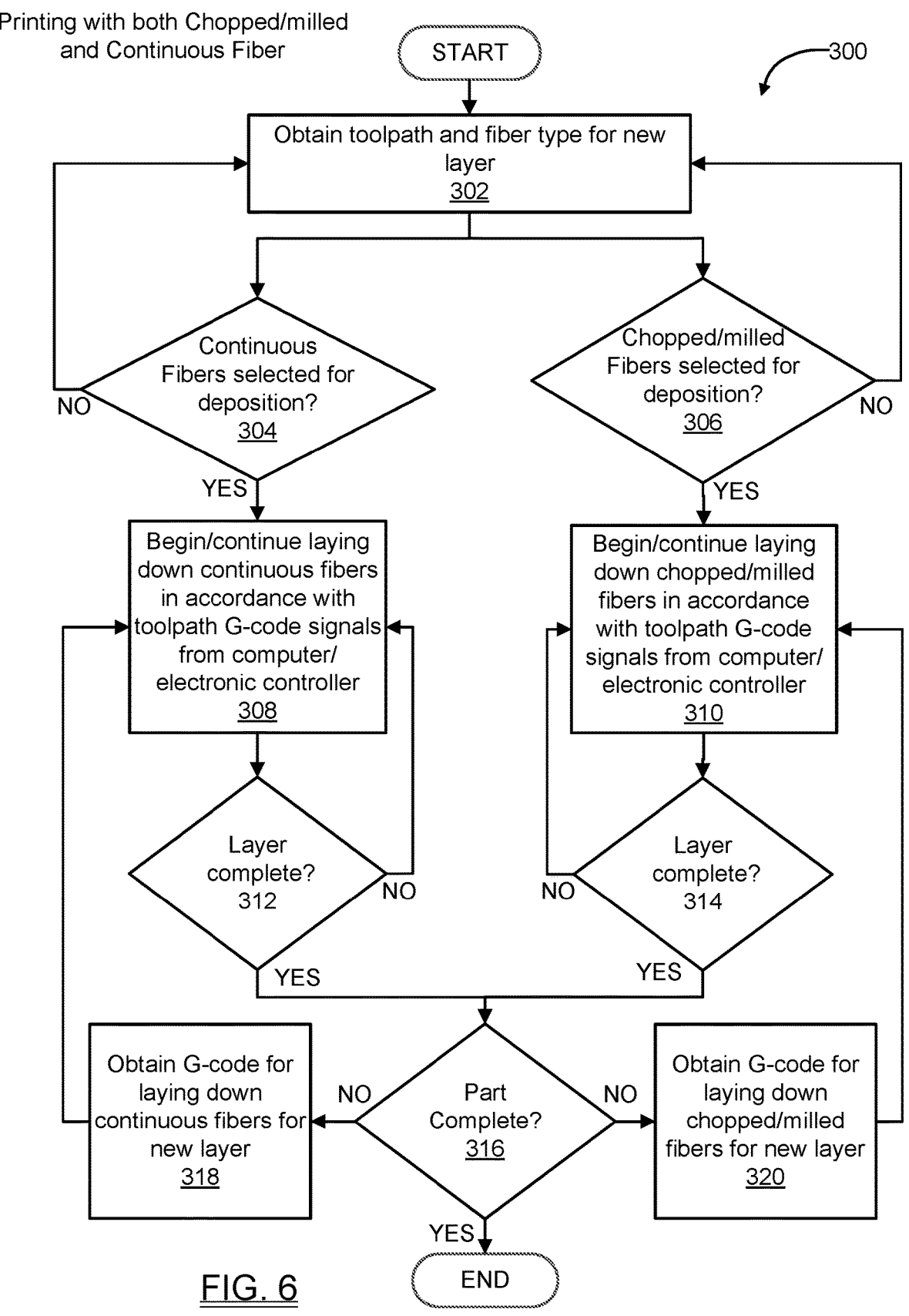
FIG. 6 is a high-level flowchart illustrating one example of various operations that may be performed by the system of FIG. 1, 1a or 1c in extruding both a continuous fiber and a stream of chopped/milled fibers.

With brief reference to FIG. 6, a flowchart 300 is shown to illustrate various operations that may be performed when printing both a continuous fiber and chopped/milled fibers. In this regard it will be appreciated that the operations set forth in flowchart 300 may be performed by any one of the system 10 of FIG. 1, system 10' of FIG. 1a or system 10" of FIG. 10c.

At operation 302, the needed toolpath information (e.g., G-code) for a new layer of a part or material being additively manufactured. At operation 304, the toolpath information (or other information needed by the computer/electronic controller, such as from 3D part design file 30 shown in FIG. 1), is obtained to use for laying down the continuous fiber 22 while printing a layer of material. Generally concurrently, at operation 306, the toolpath information needed for printing with the chopped/milled fibers 24 is also obtained, for example from 3D part design file 30.

At operation 308 printing begins with the continuous fiber 22 being laid down by the print head component 12, 12' or 12" in accordance with G-code from the computer/electronic controller 26. Printing with the chopped/milled fibers also begins at operation 310, in accordance with the G-code obtained for the new layer.

At operation 312 a check is made by the computer/ electronic controller 26 to determine if printing of the layer using the continuous fiber 22 is complete. If not, printing continues at operation 308. A similar check is made at operation 314 to determine if the printing using the chopped/ milled fibers 24 is complete, and if not, printing continues at operation 310.

When printing using the continuous fiber 22 for a given layer is detected as being complete at operation 312, then a check is made at operation 316 if the material or part is complete. If not, then G-code for the next layer to be printed is obtained using the continuous fiber 22, as indicated at operation 318, and operations 308 and 312 are repeated. Similarly, when the check at operation 314 indicates that printing of the present layer using the chopped/milled fibers 24 is complete, then check 316 is performed to determine if the material or part is complete. If not, then the G-code needed to print the next layer using the chopped/milled fibers 24 is obtained, and operations 310 and 314 are repeated. When the check at operation 316 indicates that printing using both of the continuous fiber 22 and the chopped/milled fibers 24 is complete, then printing of the material or part is complete.

Advantages/Features of Printing with Multiple Types of Fibers

The use of a single print head nozzle component with coaxial or multiple valved arrangements to perform the above on a common motional control stage, as well as the use of parallel located print nozzle systems to perform the above on a common motion control stage, provide a number of significant advantages in additive manufacturing applications. One advantage is the ability to UV gel materials and/or select portions thereof, in real time during printing, to stabilize a structure being printed, and thus to enable printing of complex high resolution features not otherwise possible using wet rheological control. The use of chopped/ milled fibers 24 also enables short fiber alignment using a shear-controlled nozzle to further help tailor the properties of the finished material or part.

Still another advantage is the ability to use UV light to selectively "tack" the continuous fiber 22 while printing a given layer, to allow non-tension control laydown and non-obvious laydown angles. Each of the systems 10, 10' and 10" may also make use of the blade 27 (i.e., a chopper) and UV tacking to start and stop laydown of discontinuous long fiber segments in a given layer of the material or part.

The various embodiments and methods further allow for the use of inline mixing to grade one composition of material (e.g., one composition of resin infused chopped/milled fibers) into another (e.g., rubber to rigid to rubber) for the purposes of providing a single material with both rigid and elastomeric regions and therefore mechanical multifunctionality (e.g., embedded features such as, without limitation, hinges, and/or springs, and/or diaphragms, and/or actuators). Indeed, with allowable materials selections, this feature can allow the formation of dielectric elastomer actuators or generator structures having the advantages of increased mechanical robustness (i.e., no layer bonds, use of CF) and ability to embed as features within larger structures for the functions of electrical actuation or energy harvesting.

The various embodiments and methods further enable in-situ thermal cure, microwave cure or ionizing radiation cure of a material or part in situ. This enables subtractive post processing, inside, to form a single process system from print to finish.

The various embodiments and methods described herein further enable and/or enhance the use of computational design optimization tools and toolpath planning to define aligned short fiber, long fiber and other materials toolpaths to yield optimized non-obvious property enhancements to manufactured materials and parts. The various systems and methods described herein also enable modification and adaptation of conventional wet filament winding simulation tools to generate G-code for the 3D printing of non-tension controlled, semi-continuous toolpaths in a hybrid 3D printed part.

The systems and methods described in the present disclosure also may significantly enhance the manufacturability of various types of parts. For example, for additively printing cylindrical or conical parts, the systems and methods described herein enable use of anodized TEFLON® polytetrafluoroethylene coated mandrels with coefficient of thermal expansion (CTE) matched printing compositions to allow expansion and pop off of a part on cure. For additively printing bell pinch, closed cylindrical or bottle shaped parts, the systems and methods described herein enable the use of a sacrificial, thermally resistant mandrel material, such as a sodium metasilicate bound glass balloon cementitious composition, which may be machined to required geometry and tolerance ex-situ or in situ.

Enhanced Manufacturability of Various Types of Parts

The ability to simultaneously print both a continuous fiber and chopped/milled fibers during printing of a single layer provides at least two valuable benefits not provided by prior AM systems, when manufacturing various types of parts: (1) the ability to deposit a range of materials with different compositions with a common cure chemistry/process on a common motion stage; and (2) the ability to transition from one class of material (e.g., rigid thermoset) to elastomer without a bond line or abrupt transitions, by means of compositional blending of resins with common chemical functionalities. One example of the second benefit mentioned directly above is a blending of rigid epoxy grades to increasing a concentration of epoxy functional polyurethane, which grades to increasing concentration of neat urethane rubber and then the reverse through to neat rigid epoxy. In an additive printing operation, this may enable the creation of a wide range of parts where an elastomeric rubber region is bounded by, or adjacent to, rigid features or zones.

Specific Examples and Description of General Processes

The present systems and methods described herein for printing using both continuous and chopped/milled fibers provide the benefit of being implementable using a common motion control stage (e.g., three or more axes) two or more parallel print heads (e.g., FIG. 1c), or coaxially arranged extrusion ports of a single print head (e.g., FIG. 1a/1b), or a multi-input valved head arrangement (e.g., FIGS. 1 and 1a), which each may deliver two or more distinct print feedstocks to a build plate within a single, sequential, or parallel extrusion/writing process. In almost all instances it is expected to be advantageous to use the continuous fiber 22 as one of the 'feeds', and in many instances another material may be some variant of the chopped/milled fibers 24, which represent short fibers, which are used simultaneously in addition to the continuous fiber 22.

In the case of parallel head nozzle deposition, two heads (e.g., FIG. 1c), one extruding short fiber thermoset, the other extruding continuous fiber filament reinforced thermoset material, with a controlled tool offset command implemented in G-code, are able to lay down both materials within a single build area, following a build design that leverages the materials properties and process advantages of both materials. This enables an AM printing system to build, in effect, a 'hybrid' chopped fiber and continuous filament fiber reinforced structure. Two or more materials printing of fiber reinforced streams are enabled in large part through using previously available UV gelling resin chemistries that allow structures and long fiber tows to be gelled in place, in real time, during the printing process. However, common X-linking chemistry between both materials streams and the process of gelling, but not completion, of a high degree of thermosetting (though optimization of catalyst concentration/activity/UV power/Flux/Time) can avert any bond discontinuities or mechanical weakness due to a bond transition between materials zones.

A further aspect of the invention related to X-linking and UV gel commonality is the ability to apply co-reactive resin blending (either via in-line mixing or metered or abrupt feedstock changes) to enable rigid load bearing regions to transition to elastomeric regions—free of bond lines and within a single part. A myriad of structures may be enabled through this approach. Some such structures may be parts with built-in vibrational damping/shock absorbers, hinges or springs. If dielectric elastomers are used, then energy harvesting/generating structures are possible. Regions of increased impact toughness, decreased stiffness and/or brittleness may also be created in an AM manufactured part during a single printing process. This allows an AM part to be created having layers or regions of coatings with enhanced impact toughness in, or on, or over, an otherwise stiff, strong part.

Another straightforward yet powerful example of a two-fiber phase and elastomer transition process such as described above, carried out using the AM systems and methods of the present disclosure, is the creation of an advanced pressure vessel. With such a pressure vessel, the inner layers of regions may be created using the systems and methods described herein from an elastomeric dominated composition, and perhaps further modified with a nanofiller such as high aspect ratio nano-clay, to further increase gas barrier properties. The composition is then transitioned to a structural zone, with midbody strength given by the use of the continuous fiber 22 material. The process transitions a third time to a short fiber (e.g., using chopped/milled fibers 24) dominated material, modified with nano-materials such as nano-whiskers and other toughening nano-particles to print the outer layers of the vessel having enhanced impact toughness and improved post processing machinability, when required. In this example three materials 'zones' may be printed, each chemically unified with the last, to produce a hybrid composite structure during a single printing process. If in situ microwave or thermal curing is performed, the green part may be fully cured with the work indexed on the stage—allowing the same code and motional control operation to continue after the curing step to a final subtractive process, where additional features may be added to the part via a milling or cutting head on the same system to provide a completed part with additive and subtractive features in a single process.

Non-Limiting Discussion of Terminology

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. The following definitions and non-limiting guidelines must be considered in reviewing the description of the technology set forth herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

All percentages are by weight of composition unless otherwise stated.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Numeric values stated herein should be understood to be approximate, and interpreted to be about the stated value, whether or not the value is modified using the word "about." Thus, for example, a statement that a parameter may have value "of X" should be interpreted to mean that the parameter may have a value of "about X." "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates variations that may arise from ordinary methods of manufacturing, measuring or using the material, device or other object to which the calculation or measurement applies.

As referred to herein, ranges are, unless specified otherwise, inclusive of endpoints and include technology of all distinct values and further divided ranges within the entire range. Thus, for example, a range of "from A to B" or "from about A to about B" is inclusive of A and of B. Further, the phrase "from about A to about B" includes variations in the values of A and B, which may be slightly less than A and slightly greater than B; the phrase may be read be "about A, from A to B, and about B." Technology of values and ranges of values for specific parameters (such as temperatures, molecular weights, weight percentages, etc.) are not exclusive of other values and ranges of values useful herein.

It is also envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that technology of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the technology.

What is claimed is:

1. A system for manufacturing a Stage 1 carbon-carbon (CC) part, comprising: a thixotropic photogellable additive manufacturing ink comprising:
(i) a resin comprising a cyanate ester resin, cyanurate resin, and a bisphenol F epoxy resin, wherein the cyanate ester resin is present at a level of from about 35% to about 45% by weight of the ink;
(ii) a UV initiator;
(iii) from about 20% to about 60% of carbon fibers selected from the group consisting of chopped fibers, milled fibers, a continuous fiber, and combinations thereof; and
(iv) from about 1% to about 25% of a thixotropic agent;
(v) wherein the thixotropic photogellable additive manufacturing ink has a gel point operable for interlayer consolidation;
an additive manufacturing system comprising:
(i) an electronic controller configured to determine and provide tool paths to provide an engineered characteristic to the Stage 1 CC part;
(ii) a print nozzle component configured to extrude the thixotropic photogellable additive manufacturing ink in a plurality of deposited layers on a sacrificial support material in accordance with the tool paths, the tool paths being designed to cause the print nozzle component to deposit the thixotropic photogellable additive manufacturing ink in the plurality of deposited layers in a layer-by-layer printing operation, such that the carbon fibers are deposited in desired orientations within each of the deposited layers as the print nozzle component moves along the tool paths; and
(iii) a UV light configured to direct UV illumination at the thixotropic photogellable additive manufacturing ink after the extrusion of the thixotropic photogellable additive manufacturing ink by the print nozzle component so as to initiate gelation of the resin upon the extrusion of the thixotropic photogellable additive manufacturing ink, to form a precursor part having an imparted or enhanced performance characteristic;
(iv) wherein the system is configured to partially cure the thixotropic photogellable additive manufacturing ink during the deposit of the thixotropic photogellable additive manufacturing ink while allowing molecular diffusion across the layers of the deposited thixotropic photogellable additive manufacturing ink; and a pyrolysis subsystem configured to pyrolyze the precursor part printed using the AM system to create the Stage 1 CC part.

2. The system of claim 1, wherein the additive manufacturing ink comprises the continuous fiber and at least one of chopped fibers or milled fibers.

3. The system of claim 1, wherein the the cyanate ester and the cyanurate resin are present in the composition at a ratio of from about 80:20 to about 50:50.

4. The system of claim 1, wherein the thixotropic agent comprises high surface area fumed silica.

5. The system of claim 1, wherein the additive manufacturing ink further comprises from about 2% to about 10% of an additive selected from the group consisting of nanoplatelets and nanofibers.

6. The system of claim 5, wherein the additive manufacturing ink further comprises ceramic nano fibers.

7. The system of claim 6, wherein the ceramic nano fibers are selected from the group consisting of silicon carbide (SiC) fibers, boron nitride (BN) fibers, or mixtures thereof.

8. The system of claim 1, wherein the carbon fibers have a length of between 0.5 $\mu$m to 2000 $\mu$m.

9. The system of claim 8, wherein the resin has a loading of the carbon fibers of from about 20 to about 60% by volume.

10. The system of claim 8, wherein the additive manufacturing ink further comprises an epoxy functional colloidal silica nanoparticle dispersion.

11. The system of claim 1, wherein the UV initiator is selected from the group consisting of a type 1 UV initiator, a type 2 UV initiator, cationic ring-opening UV initiator, and mixtures thereof.

12. The system of claim 1, wherein the additive manufacturing ink further comprises rare earth organometallic epoxy curatives, a transition metal organic coordination complex, or a mixture thereof.

13. The system of claim 1, wherein the additive manufacturing ink is doped with a transition metal salt.

14. The system of claim 1, further comprising a densification subsystem including at least one resin bath and a pyrolysis subsystem, for further densifying the Stage 1 CC part.

15. A method for producing a Stage 1 carbon-carbon (CC) part, comprising using the system of claim 1, the method comprising:

creating the tool path needed to provide, the engineered characteristic to the Stage 1 CC part;

extruding the thixotropic photogellable additive manufacturing ink through the print nozzle component in accordance with the tool path onto a the sacrificial support material layer, the tool path being designed to cause the print nozzle component to deposit the thixotropic photogellable additive manufacturing ink in the layer-by-layer printing operation, such that the carbon fibers are deposited in the desired orientations within each of the deposited layers; and exposing the additive manufacturing ink to UV illumination using the UV light after the resin in extruded from the print nozzle component so as to initiate gelation of the resin upon the extrusion of the thixotropic photogellable additive manufacturing ink, to form a precursor part having an imparted or enhanced performance characteristic; and pyrolyzing the precursor part to create the Stage 1 CC part using the pyrolysis subsystem.

16. The method of claim 15, further comprising densifying the Stage 1 CC part.

\* \* \* \* \*